(12) United States Patent
Tahata et al.

(10) Patent No.: US 11,722,069 B2
(45) Date of Patent: Aug. 8, 2023

(54) POWER CONVERSION SYSTEM

(71) Applicant: Mitsubishi Electric Corporation, Tokyo (JP)

(72) Inventors: Kazuyori Tahata, Tokyo (JP);
Fuminori Nakamura, Tokyo (JP);
Shigeo Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/628,994

(22) PCT Filed: Aug. 8, 2019

(86) PCT No.: PCT/JP2019/031382
§ 371 (c)(1),
(2) Date: Jan. 21, 2022

(87) PCT Pub. No.: WO2021/024455
PCT Pub. Date: Feb. 11, 2021

(65) Prior Publication Data
US 2022/0263424 A1      Aug. 18, 2022

(51) Int. Cl.
*H02M 5/458*        (2006.01)
*H02M 7/483*        (2007.01)
(Continued)

(52) U.S. Cl.
CPC ....... *H02M 5/4585* (2013.01); *H02M 1/0064* (2021.05); *H02M 1/088* (2013.01);
(Continued)

(58) Field of Classification Search
CPC ............. H02M 5/4585; H02M 7/4835; H02M 1/0064; H02M 1/088; H02M 1/4241; H02M 7/483
See application file for complete search history.

(56) References Cited

U.S. PATENT DOCUMENTS

2013/0016541 A1    1/2013   Norrga et al.
2013/0070491 A1    3/2013   Jiang-haefner et al.
(Continued)

FOREIGN PATENT DOCUMENTS

CN    105322528 A    2/2016
EP    2905889 A1    8/2015
(Continued)

OTHER PUBLICATIONS

International Search Report (PCT/ISA/210) with English translation and Written Opinion (PCT/ISA/237) dated Oct. 21, 2019, by the Japan Patent Office as the International Searching Authority for International Application No. PCT/JP2019/031382.
(Continued)

*Primary Examiner* — Adolf D Berhane
(74) *Attorney, Agent, or Firm* — Buchanan Ingersoll & Rooney PC

(57) ABSTRACT

A power conversion system includes: a self-excited power converter to perform power conversion between a first AC system and a DC system; a first transformer having a primary side connected to the first AC system and a secondary side connected to the self-excited power converter; and a first impedance circuit connected between a ground and a neutral point on the secondary side of the first transformer, or between the ground and an AC line connecting the secondary side of the first transformer and the self-excited power converter. The first impedance circuit includes one of a reactor and another transformer.

20 Claims, 9 Drawing Sheets

(51) Int. Cl.
  *H02M 1/00* (2006.01)
  *H02M 1/088* (2006.01)
  *H02M 1/42* (2007.01)

(52) U.S. Cl.
  CPC ......... *H02M 1/4241* (2013.01); *H02M 7/483* (2013.01); *H02M 7/4835* (2021.05)

(56) References Cited

U.S. PATENT DOCUMENTS

2016/0061873 A1  3/2016  Liu et al.
2021/0091660 A1* 3/2021  Takahashi ........... H02M 7/4835

FOREIGN PATENT DOCUMENTS

| JP | H0767256 A | 3/1995 |
| JP | 2003033039 A | 1/2003 |
| JP | 2011147244 A | 7/2011 |
| JP | 2012130107 A | 7/2012 |
| JP | 2015122908 A | 7/2015 |
| JP | 2015130746 A | 7/2015 |
| RU | 2524347 C2 | 7/2014 |

OTHER PUBLICATIONS

Notice of Reasons for Refusal for Application No. JP 2020-511823, dated Apr. 22, 2020. (8 pages).
Bui, et al., "Investigation on Transient Behaviours of a Uni-Grounded Low-Voltage AC Microgrid and Evaluation on its Available Fault Protection Methods: Review And Proposals", Renewable and Sustainable Energy Reviews, vol. 75, Aug. 31, 2017, pp. 1417-1452.
Extended European Search Report dated Jul. 6, 2022, issued in corresponding European Patent Application No. 19940576.2, 11 pages.

* cited by examiner

POWER CONVERSION SYSTEM

TECHNICAL FIELD

The present disclosure relates to a power conversion system.

BACKGROUND ART

According to a modular multi-level converter (hereinafter also referred to as an MMC converter) constituted of a plurality of cascaded unit converters, the number of these unit converters is increased to thereby allow such a modular multi-level converter to readily handle high voltages. A "unit converter" is also referred to as a "sub-module" or a "converter cell". An MMC converter has been widely applied as a large-capacity static var compensator or a power conversion device for high-voltage direct-current (DC) power transmission to a power transmission and distribution system.

In Japanese Patent Laying-Open No. 2015-130746 (PTL 1), a power conversion device configured of MMC converters is linked to a three-phase power system via a transformer, and a neutral point on the secondary side of the transformer is grounded.

CITATION LIST

Patent Literature

PTL 1: Japanese Patent Laying-Open No. 2015-130746

SUMMARY OF INVENTION

Technical Problem

As in PTL 1, in a power conversion system including a self-excited power converter configured in an MMC system or the like, a neutral point on the secondary side of a transformer is grounded in order to fix a DC potential to ground of the power converter. In PTL 1, however, the neutral point on the secondary side of the transformer is directly grounded. Thus, for example, when a ground fault occurs on an alternating-current (AC) line connected to the power converter and the transformer, or when a ground fault occurs on a DC line connected to the power converter, a high fault current flows through the ground at the neutral point.

An object of an aspect of the present disclosure is to provide a power conversion system capable of reducing a fault current flowing upon occurrence of a ground fault on an AC side or a DC side of a self-excited power converter while fixing a DC potential to ground of the self-excited power converter.

Solution to Problem

A power conversion system according to an embodiment includes: a self-excited power converter to perform power conversion between a first AC system and a DC system; a first transformer having a primary side connected to the first AC system and a secondary side connected to the self-excited power converter; and a first impedance circuit connected between a ground and a neutral point on the secondary side of the first transformer, or between the ground and an AC line connecting the secondary side of the first transformer and the self-excited power converter. The first impedance circuit includes one of a reactor and another transformer.

A power conversion system according to another embodiment includes: a self-excited power converter to perform power conversion between a first AC system and a DC system; a first transformer having a primary side connected to the first AC system and a secondary side connected to the self-excited power converter; and a first impedance circuit connected between a ground and a neutral point on the secondary side of the first transformer, or between the ground and an AC line connecting the secondary side of the first transformer and the self-excited power converter. The first impedance circuit includes another power converter. When an AC voltage is applied to the neutral point, the another power converter controls an output voltage from the another power converter such that a difference voltage between the output voltage and a voltage between the neutral point and the ground is less than a threshold voltage. When a DC voltage is applied to the neutral point, the another power converter controls the output voltage to be a zero voltage.

A power conversion system according to still another embodiment includes: a power converter to perform power conversion between an AC system and a DC system; a first impedance circuit connected to a positive electrode side of the DC system; and a second impedance circuit connected to a negative electrode side of the DC system. Each of the first impedance circuit and the second impedance circuit is configured of at least one of a resistance and a capacitor. The positive electrode side and the negative electrode side are grounded via the first impedance circuit and the second impedance circuit, respectively.

Advantageous Effects of Invention

According to the present disclosure, a fault current flowing upon occurrence of a ground fault on an AC side or a DC side of a self-excited power converter can be reduced while fixing a DC potential to ground of the self-excited power converter.

DESCRIPTION OF EMBODIMENTS

Figure 1:
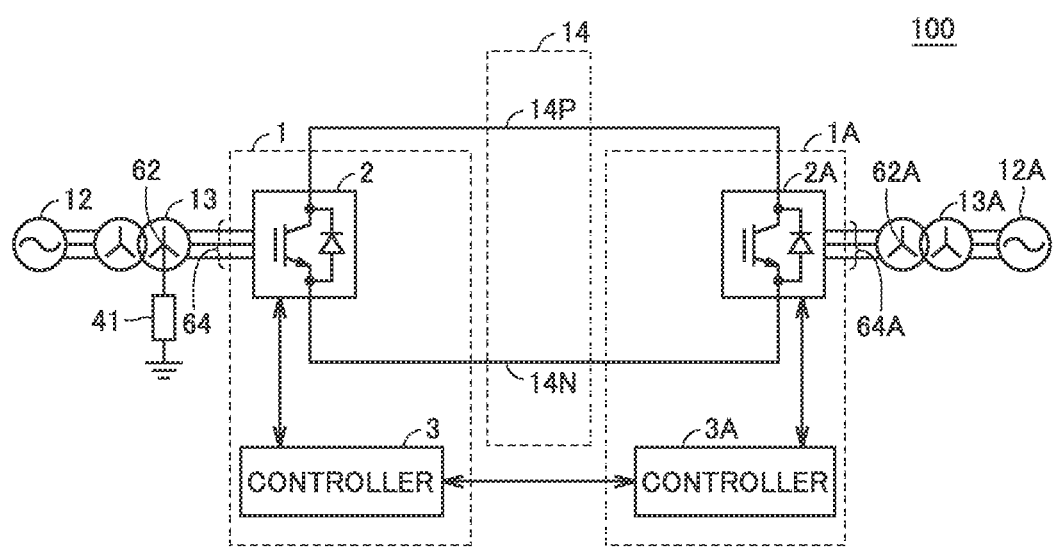
FIG. 1 is a diagram showing a schematic configuration of a power conversion system according to a first embodiment.

Embodiments of the present disclosure will be hereinafter described with reference to the accompanying drawings. In the following description, the same components are denoted by the same reference characters. Names and functions thereof are also the same. Therefore, the detailed description thereof will not be repeated.

First Embodiment

<Overall Configuration of System>

FIG. 1 is a diagram showing a schematic configuration of a power conversion system 100 according to the first embodiment. Referring to FIG. 1, power conversion system 100 is a system for controlling electric power in a DC power transmission system having a single electrode configuration. Electric power is transmitted and received between two AC systems 12 and 12A through a DC power transmission line 14P on a positive electrode side and a DC power transmission line 14N on a negative electrode side that constitute a DC system 14. AC systems 12 and 12A each are a three-phase AC system. For example, DC system 14 is a DC power transmission line having a capacitance.

In FIG. 1, when power conversion system 100 supports a high voltage direct current (HVDC) system, the length of each of DC power transmission lines 14P and 14N is several tens of kilometers to several hundreds of kilometers, for example. When power conversion system 100 supports a back-to-back (BTB) system, the length of each of DC power transmission lines 14P and 14N is several meters to several tens of meters, for example. FIG. 1 shows a case where a DC system has two terminals.

A power conversion device 1 includes: a self-excited power converter 2 to perform power conversion between DC system 14 and AC system 12; and a controller 3. Typically, power converter 2 is configured of an MMC conversion-type power converter. Note that power converter 2 may be of a conversion type other than the MMC conversion type. Power converter 2 is connected to DC power transmission lines 14P and 14N. Power converter 2 is also connected to AC system 12 via a transformer 13. Power converter 2 and transformer 13 are connected to each other via an AC line 64. Controller 3 controls the operation of power converter 2. Controller 3 is capable of communicating with a controller 3A.

A power conversion device 1A includes a self-excited power converter 2A and controller 3A. Power converter 2A is connected to power converter 2 via DC power transmission lines 14P and 14N. Power converter 2A is connected to an AC system 12A via a transformer 13A. Power converter 2A and transformer 13A are connected to each other via an AC line 64A. Controller 3A controls the operation of power converter 2A. Power conversion device 1A has the same configuration as that of power conversion device 1.

When electric power is transmitted from AC system 12A to AC system 12, power converter 2A operates as a rectifier (REC), and power converter 2 operates as an inverter (INV). Specifically, AC power is converted by power converter 2A into DC power that is then DC-transmitted via DC power transmission lines 14P and 14N. At a power receiving end, DC power is converted by power converter 2 into AC power that is then supplied to AC system 12 via transformer 13. When power converter 2A operates as an inverter and power converter 2 operates as a rectifier, the power conversion operation is performed in a reverse manner.

Transformer 13 is connected between AC system 12 and power converter 2. Specifically, AC system 12 is connected to the primary side of transformer 13, and power converter 2 is connected to the secondary side of transformer 13. For example, transformer 13 is a three-phase transformer configured in a Y-Y connection. Transformer 13 has a Y-connected primary winding and a secondary winding that has a neutral point 62 grounded via an impedance circuit 41. In other words, impedance circuit 41 is connected between neutral point 62 on the secondary side of transformer 13 and the ground. Although details will be described later, impedance circuit 41 is configured of a reactor, a potential transformer, a grounding transformer, or the like.

Neutral point 62 on the secondary side of transformer 13 is grounded via impedance circuit 41, and thereby, the DC potential to ground of power converter 2 can be fixed. This prevents occurrence of an extreme imbalance in the voltage to ground between the positive electrode and the negative electrode of power converter 2, and thereby can avoid an excessive insulation design in consideration of such an imbalance. Further, neutral point 62 is grounded via impedance circuit 41. Thus, a fault current flowing through the ground upon occurrence of a ground fault on the DC side (for example, DC power transmission lines 14P and 14N) or on the AC side (for example, AC line 64) of power converter 2 is reduced by impedance circuit 41. This can prevent an excessive current from flowing through power converter 2 and transformer 13.

Transformer 13A is connected between AC system 12A and power converter 2A. Specifically, AC system 12A is connected to the primary side of transformer 13A, and power converter 2A is connected to the secondary side of transformer 13A. For example, transformer 13A is a three-phase transformer configured in a Y-Y connection. Note that a neutral point 62A on the secondary side of transformer 13A is not grounded in a normal state in which no fault occurs.

<Configuration of Power Conversion Device>

Figure 2:
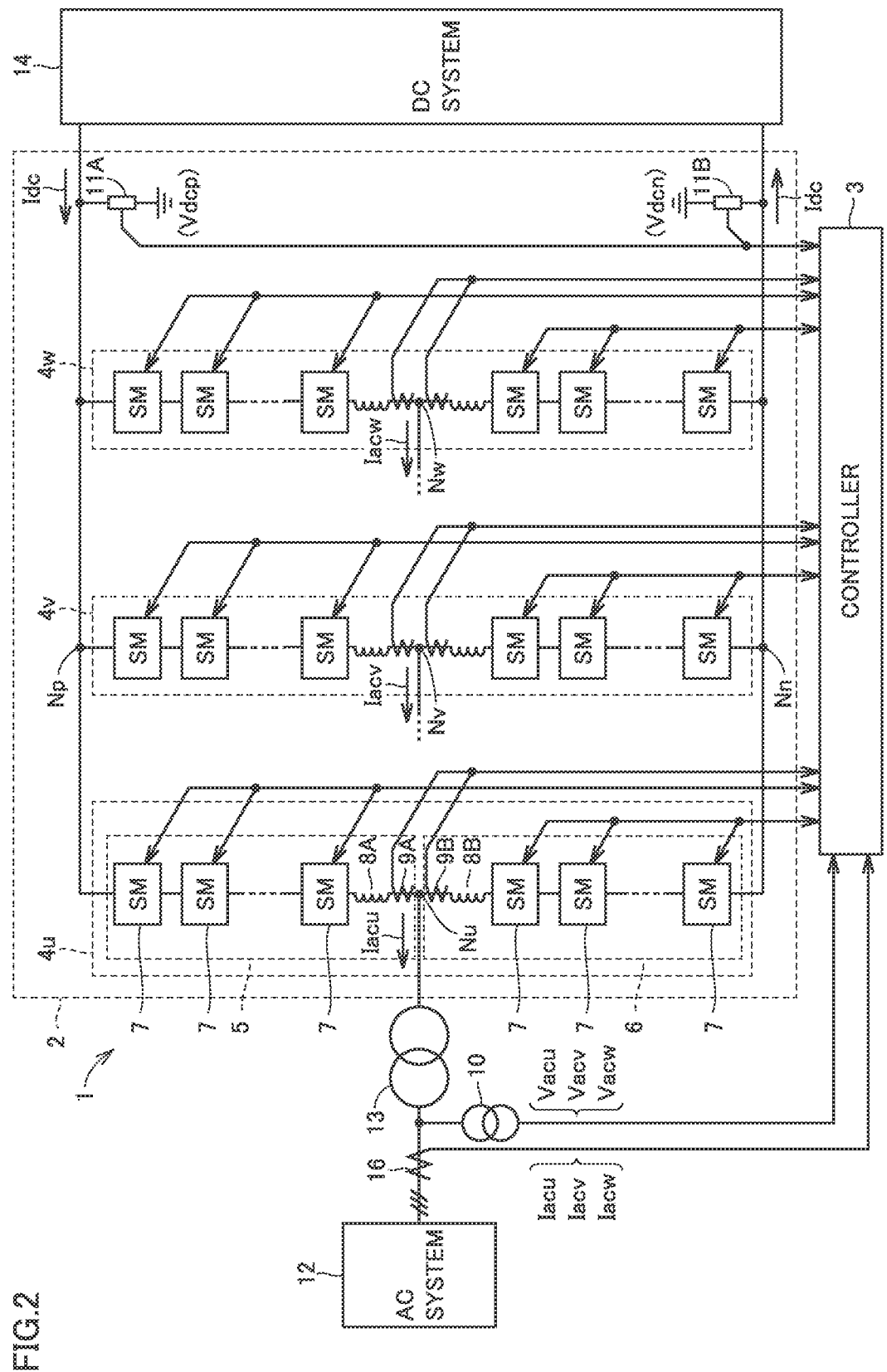
FIG. 2 is a schematic configuration diagram of a power conversion device.

FIG. 2 is a schematic configuration diagram of power conversion device 1 configured in an MMC conversion scheme. Referring to FIG. 2, power conversion device 1 is configured of an MMC converter including a plurality of sub-modules (corresponding to "SM" in FIG. 2) 7 connected in series to each other.

Power converter 2 includes a plurality of leg circuits 4u, 4v, and 4w (hereinafter referred to as a "leg circuit 4" when leg circuits 4u, 4v, and 4w are collectively mentioned or when any one of leg circuits 4u, 4v, and 4w is mentioned) connected in parallel to each other between a positive DC terminal (i.e., a high potential-side DC terminal) Np and a negative DC terminal (i.e., a low potential-side DC terminal) Nn.

Leg circuit 4 is provided in each of a plurality of phases of an alternating current. Leg circuit 4 is connected between AC system 12 and DC system 14 to perform power conversion therebetween. Power converter 2 is provided with three leg circuits 4u, 4v, and 4w corresponding to a U phase, a V phase, and a W phase, respectively.

Leg circuits 4u, 4v, 4w are respectively provided with AC input terminals Nu, Nv, Nw, each of which is connected via transformer 13 to AC system 12. For ease of illustration, FIG. 2 does not show connection of AC input terminals Nv and Nw to transformer 13. High potential-side DC terminal Np and low potential-side DC terminal Nn that are connected in common to each leg circuit 4 are connected to DC system 14.

Leg circuit 4u includes: an upper arm 5 from high potential-side DC terminal Np to AC input terminal Nu; and a lower arm 6 from low potential-side DC terminal Nn to AC input terminal Nu. AC input terminal Nu, which is a connection point between upper arm 5 and lower arm 6, is connected to transformer 13. Since leg circuits 4v and 4w each are configured in the same manner, leg circuit 4u will be hereinafter described as a representative example.

Upper arm 5 includes a plurality of cascaded sub-modules 7 and a reactor 8A. The plurality of sub-modules 7 and reactor 8A are connected in series to each other. Lower arm 6 includes a plurality of cascaded sub-modules 7 and a reactor 8B. The plurality of sub-modules 7 and reactor 8B are connected in series to each other.

As detectors for measuring the amount of electricity (for example, a current, a voltage, and the like) to be used for control, power conversion device 1 includes an AC voltage detector 10, an AC current detector 16, DC voltage detectors 11A, 11B, and arm current detectors 9A, 9B disposed in each leg circuit 4. The signals detected by these detectors are input into controller 3.

For ease of illustration in FIG. 1, a signal line through which a signal is input from each detector to controller 3 and a signal line through which a signal is input and output between controller 3 and each sub-module 7 are illustrated partially in a collective manner, but actually are provided for each detector and each sub-module 7. The signal lines between each sub-module 7 and controller 3 may be provided separately for transmission and reception. The signal lines are formed of optical fibers, for example.

AC voltage detector 10 detects a U-phase AC voltage Vacu, a V-phase AC voltage Vacv, and a W-phase AC voltage Vacw in AC system 12. AC current detector 16 detects a U-phase AC current Iacu, a V-phase AC current Iacv, and a W-phase AC current Iacw in AC system 12. DC voltage detector 11A detects a DC voltage Vdcp at high potential-side DC terminal Np connected to DC system 14. DC voltage detector 11B detects a DC voltage Vdcn at low potential-side DC terminal Nn connected to DC system 14. The difference between DC voltage Vdcp and DC voltage Vdcn is defined as a DC voltage Vdc.

Arm current detectors 9A and 9B provided in leg circuit 4u for U phase detect an upper arm current Ipu flowing through upper arm 5 and a lower arm current Inu flowing through lower arm 6, respectively. Similarly, arm current detectors 9A and 9B provided in leg circuit 4v for V phase detect an upper arm current Ipv and a lower arm current Inv, respectively. Arm current detectors 9A and 9B provided in leg circuit 4w for W phase detect an upper arm current Ipw and a lower arm current Inw, respectively.

Figure 3:
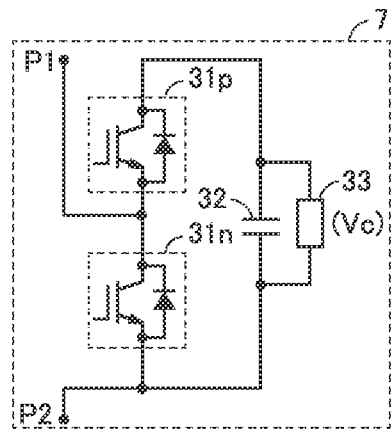
FIG. 3 is a circuit diagram showing an example of a sub-module constituting each of leg circuits in FIG. 2.

FIG. 3 is a circuit diagram showing an example of a sub-module constituting each of the leg circuits in FIG. 2. Specifically, sub-module 7 shown in FIG. 3 has a circuit configuration referred to as a half bridge configuration. Sub-module 7 includes a series body formed by connecting two switching elements 31p and 31n in series, a power storage element 32, and a voltage detector 33. The serial body and power storage element 32 are connected in parallel. Voltage detector 33 detects the voltage across power storage element 32.

Both terminals of switching element 31n are defined as input and output terminals P1 and P2. By the switching operations of switching elements 31p and 31n, the voltage across power storage element 32 and a zero voltage are output. For example, when switching element 31p is turned on and switching element 31n is turned off, the voltage across power storage element 32 is output. When switching element 31p is turned off and switching element 31n is turned on, a zero voltage is output. In FIG. 3, both terminals of switching element 31n are defined as input and output terminals P1 and P2, but both terminals of switching element 31p may be defined as input and output terminals P1 and P2, in which case the operation is performed in a reverse manner.

Switching elements 31p and 31n are configured by antiparallel connection of a freewheeling diode (FWD) to a self-arc-extinguishing semiconductor switching element such as an insulated gate bipolar transistor (IGBT), a gate commutated turn-off (GCT) thyristor, or a metal oxide semiconductor field-effect transistor (MOSFET). Power storage element 32 is configured mainly using a film capacitor or the like.

The configuration of sub-module 7 described above is merely by way of example and sub-module 7 having another configuration may be applied to the present embodiment. For example, sub-module 7 may be configured using a full bridge-type conversion circuit.

Referring again to FIG. 2, controller 3 controls the operation of power converter 2 based on the received current value and voltage value. Controller 3 typically includes, as a hardware configuration, an auxiliary transformer, an analog-to-digital (AD) conversion unit, a computing unit, and the like. The computing unit includes a central processing unit (CPU), a random access memory (RAM), and a read only memory (ROM). The AD conversion unit includes an analog filter, a sample and hold circuit, a multiplexer, and the like. Controller 3 is configured of a digital protection controller, for example.

<Configuration of Impedance Circuit>

Various configurations of impedance circuit 41 will be hereinafter described.

(Reactor)

Figure 4:
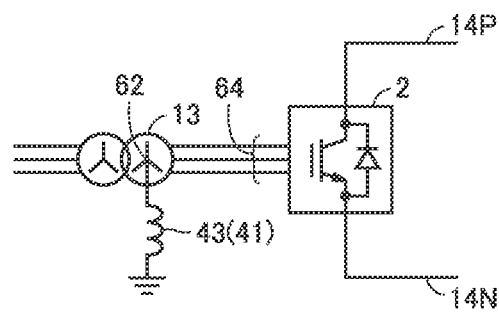
FIG. 4 is a diagram showing an example in which an air-core reactor is applied as an impedance circuit.

Referring to FIGS. 4 to 7, the following describes an example in which impedance circuit 41 is mainly configured of a reactor. FIG. 4 is a diagram showing an example in which an air-core reactor is applied as impedance circuit 41.

Referring to FIG. 4, an air-core reactor 43 as impedance circuit 41 is connected between neutral point 62 on the secondary side of transformer 13 and the ground. In this case, the reactor is high in impedance in an AC manner but is low in impedance in a DC manner (for example, ideally zero). Thus, when neutral point 62 is grounded via air-core reactor 43, the impedance becomes low in a DC manner to thereby allow effective grounding, whereas the impedance becomes high in an AC manner to thereby allow reduction of a fault current.

Further, in power converter 2 used in a three-phase AC system, a method of superimposing a third-order harmonic on the output voltage may be employed. This method is used to appropriately superimpose a third-order harmonic to thereby cancel the third-order harmonic component of the line voltage for improving the output voltage utilization factor. In the case where the above-mentioned method is employed, even in a normal state in which no fault occurs, a third-order harmonic is applied to the neutral point of transformer 13, so that a current associated therewith flows to the ground. However, when air-core reactor 43 having a high impedance in an AC manner is applied as impedance circuit 41, the current flowing to the ground due to the third-order harmonic can be reduced. Therefore, an increase in current loss and an environmental influence, which result from a current flowing to the ground, can be reduced.

Further, the third-order harmonics are distributed to the terminals on the AC side and the DC side due to the balance of the impedance to ground between the AC side and the DC side of power converter 2. In this case, when the neutral point of the transformer is directly grounded as in PTL 1, the ratio of the third-order harmonic applied to the DC side (i.e., the DC system 14 side) of power converter 2 increases. Thus, a waveform in which a third-order harmonic is superimposed on a DC voltage appears on DC power transmission lines 14P and 14N, which is problematic in terms of the insulation design, radio noise, induction current, and the like for DC power transmission lines 14P and 14N. However, by appropriately setting the impedance of impedance circuit 41, the third-order harmonic superimposed on the DC side can be reduced.

Specifically, an impedance Zg of impedance circuit 41 (in this case, air-core reactor 43) is set based on the following three conditions A1 to A3. Note that conditions A1 to A3 are not only applied to a configuration in which air-core reactor 43 is applied as impedance circuit 41 but also applied in common to various configurations of impedance circuit 41 described below.

First, impedance Zg is set to satisfy condition A1 that the fault current flowing through power converter 2 upon occurrence of a ground fault on the DC side or the AC side of power converter 2 is equal to or less than the withstand current of each of switching elements 31p and 31n.

Secondly, impedance Zg is set to satisfy condition A2 that a current Ig flowing to the ground by applying a third-order harmonic to neutral point 62 is equal to or less than a current threshold value Ith.

Thirdly, impedance Zg is set to satisfy condition A3 that the ratio of the third-order harmonic applied to the DC side of power converter 2 is X % of the total. Specifically, assuming that the impedance on the AC side of power converter 2 is defined as Zac and the impedance on the DC side is defined as Zdc, then, $X=100 \times \{Zdc/(Zac+Zdc)\}$. In this case, assuming that the impedance other than impedance Zg in impedance Zac is defined as Zac0, then, $Zac=Zg+Zac0$. Thus, by appropriately setting impedance Zg, the ratio of the third-order harmonic applied to the DC side of power converter 2 can be adjusted to be X % of the total.

When air-core reactor 43 is employed as impedance circuit 41, the impedance (more specifically, the inductance) of air-core reactor 43 is set to satisfy conditions A1 to A3. Thereby, the current upon occurrence of a ground fault can be reduced, the current resulting from the third-order harmonic in a normal state can be reduced, and the DC voltage fluctuation caused by superimposition of the third-order harmonic can be suppressed.

In addition, in the case of air-core reactor 43, there is no possibility of occurrence of saturation even when a DC voltage is superimposed on neutral point 62 or AC line 64 upon occurrence of a ground fault. Thus, air-core reactor 43 is advantageous since there is no concern about a high current resulting from saturation.

Figure 5:
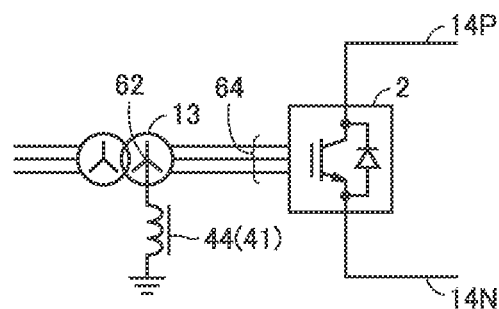
FIG. 5 is a diagram showing an example in which an iron-core reactor is applied as an impedance circuit.

FIG. 5 is a diagram showing an example in which an iron-core reactor is applied as impedance circuit 41. Referring to FIG. 5, iron-core reactor 44 as impedance circuit 41 is connected between neutral point 62 on the secondary side of transformer 13 and the ground.

In this case, the higher impedance of impedance circuit 41 is more effective at: reducing the fault current upon occurrence of a ground fault on the AC side or the DC side of power converter 2; reducing the current flowing to the ground in a normal state; and reducing the third-order harmonic component superimposed on DC power transmission lines 14P and 14N.

As compared with air-core reactor 43 in FIG. 4, iron-core reactor 44 can easily increase the inductance without increasing its size, i.e., can increase the impedance value with respect to the alternating current. On the other hand, since the increased inductance does not increase the impedance in a DC manner, the effect of fixing the DC potential to ground is not impaired.

Accordingly, when the impedance (in this case, the inductance) needs to be increased in order to satisfy the above-described conditions A1 to A3, it is advantageous to apply iron-core reactor 44 as impedance circuit 41.

Figure 6:
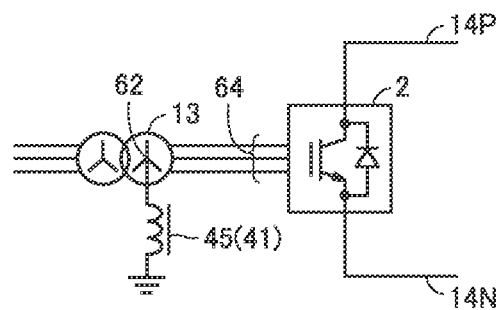
FIG. 6 is a diagram showing an example in which a gapped iron-core reactor is applied as an impedance circuit.

FIG. 6 is a diagram showing an example in which a gapped iron-core reactor is applied as impedance circuit 41. Referring to FIG. 6, a gapped iron-core reactor 45 as impedance circuit 41 is connected between neutral point 62 on the secondary side of transformer 13 and the ground.

Saturation is less likely to occur in gapped iron-core reactor 45 than in iron-core reactor 44 in FIG. 5. This can prevent a fault current from becoming excessive due to saturation when the DC voltage is superimposed on neutral point 62 or AC line 64 upon occurrence of a ground fault in DC system 14 or on AC line 64.

Further, since gapped iron-core reactor 45 has an iron core, the inductance can be increased more easily by gapped iron-core reactor 45 than by air-core reactor 43 in FIG. 4. Therefore, when the inductance needs to be increased in order to satisfy the above-described conditions A1 to A3, it is more advantageous to apply gapped iron-core reactor 45 as impedance circuit 41 than to apply air-core reactor 43 as impedance circuit 41.

Figure 7:
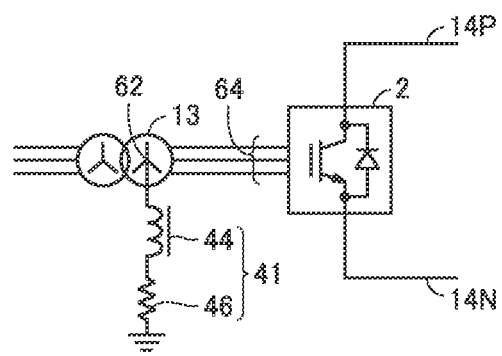
FIG. 7 is a diagram showing an example in which a series circuit of an iron-core reactor and a resistance is applied as an impedance circuit.

FIG. 7 is a diagram showing an example in which a series circuit of an iron-core reactor and a resistance is applied as impedance circuit 41. Referring to FIG. 7, impedance circuit 41 is configured of a series circuit in which iron-core reactor 44 and a resistance 46 are connected in series.

According to the configuration shown in FIG. 7, when a DC voltage is superimposed on neutral point 62 or AC line 64 upon occurrence of a ground fault in DC system 14 or on AC line 64, the DC voltage is divided by resistance 46, so that the DC voltage applied to iron-core reactor 44 can be reduced. Therefore, iron-core reactor 44 is less likely to be saturated. Further, even when iron-core reactor 44 is saturated, the fault current can be reduced by resistance 46. Note that the same effect can also be achieved even when gapped iron-core reactor 45 shown in FIG. 6 is applied in place of iron-core reactor 44. In other words, impedance circuit 41 may be configured of a series circuit in which gapped iron-core reactor 45 and resistance 46 are connected in series.

Thus, applying the series circuit shown in FIG. 7 as impedance circuit 41 can reduce the fault current caused upon occurrence of a ground fault on the DC side or the AC side of power converter 2, can make it difficult to cause saturation of the iron core, and also, can reduce the fault current even when saturation occurs. However, when the resistance value of resistance 46 is excessively large, impedance circuit 41 is high in impedance in a DC manner, and thereby, the effect of fixing the DC potential to ground of power converter 2 decreases. Thus, the resistance value of resistance 46 needs to be set to the level at which the effect of fixing the DC potential to ground of power converter 2 is ensured.

(Transformer)

Figure 8:
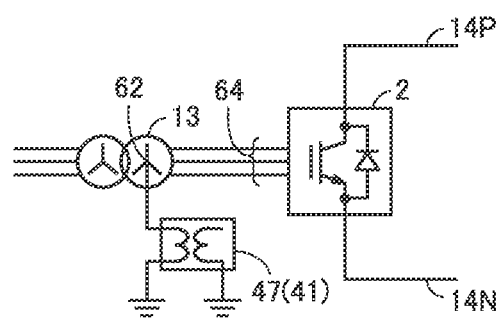
FIG. 8 is a diagram showing an example in which a potential transformer is applied as an impedance circuit.

Referring to FIGS. 8 to 12, the following describes an example in which impedance circuit 41 is configured of a transformer. FIG. 8 is a diagram showing an example in which a potential transformer is applied as impedance circuit 41.

Referring to FIG. 8, a potential transformer 47 as impedance circuit 41 is connected between neutral point 62 on the secondary side of transformer 13 and the ground. Specifically, the primary winding of potential transformer 47 is connected between neutral point 62 and the ground. In this case, since potential transformer 47 functions as an inductor, the same effect as that achieved by iron-core reactor 44 described above is achieved.

Specifically, when neutral point 62 is grounded via potential transformer 47, the impedance becomes low in a DC manner to thereby allow effective grounding, whereas the impedance becomes high in an AC manner to thereby allow reduction of a fault current. Further, employing potential transformer 47 as impedance circuit 41 allows measurement of the voltage to ground at neutral point 62 or on AC line 64, thereby eliminating the need to separately provide a device for measurement. Note that it is preferable to set the impedance of potential transformer 47 so as to satisfy the above-described conditions A1 to A3.

Figure 9:
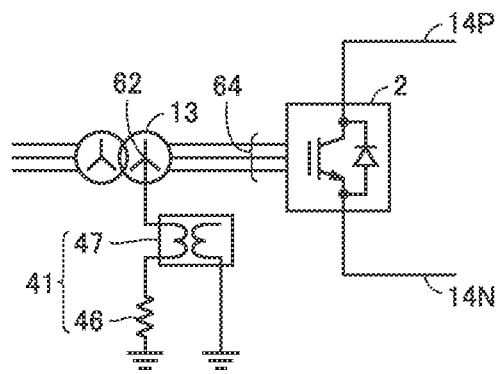
FIG. 9 is a diagram showing an example in which a series circuit of a potential transformer and a resistance is applied as an impedance circuit.

FIG. 9 is a diagram showing an example in which a series circuit of a potential transformer and a resistance is applied as impedance circuit 41. Referring to FIG. 9, impedance circuit 41 is configured of a series circuit in which potential transformer 47 and resistance 46 are connected in series.

The primary withstand current of potential transformer 47 is relatively small. Thus, saturation of potential transformer 47 may cause burnout of potential transformer 47 unless the current flowing at that time is reduced. As shown in FIG. 9, according to the configuration in which resistance 46 is connected in series to potential transformer 47, when a DC voltage is superimposed on neutral point 62 or AC line 64 upon occurrence of a ground fault in DC system 14 or on AC line 64, the DC voltage is divided by resistance 46, so that the DC voltage applied to potential transformer 47 can be reduced. Thus, potential transformer 47 is less likely to be saturated. Also, even when potential transformer 47 is saturated, the fault current can be reduced by resistance 46.

As in the configuration in FIG. 7, however, when the resistance value of resistance 46 is excessively large, the impedance of impedance circuit 41 becomes high in a DC manner, thereby reducing the effect of fixing the DC potential to ground of power converter 2. Thus, the resistance value of resistance 46 needs to be set to the level at which the effect of fixing the DC potential to ground of power converter 2 is ensured.

Figure 10:
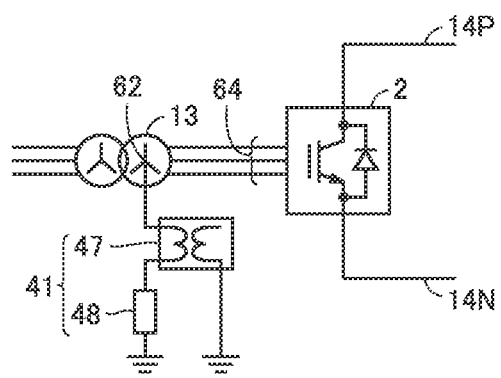
FIG. 10 is a diagram showing an example in which a series circuit of a potential transformer and a fuse is applied as an impedance circuit.

FIG. 10 is a diagram showing an example in which a series circuit of a potential transformer and a fuse is applied as impedance circuit 41. Referring to FIG. 10, impedance circuit 41 is configured of a series circuit in which potential transformer 47 and a fuse 48 are connected in series.

As shown in FIG. 10, according to the configuration in which fuse 48 is connected in series to potential transformer 47, even in the case where potential transformer 47 is saturated when a DC voltage is superimposed on neutral point 62 or AC line 64 upon occurrence of a ground fault in DC system 14 or on AC line 64, the fault current can be broken by fuse 48 before the fault current becomes excessive. This can prevent burnout of potential transformer 47. Note that fuse 48 is configured to be disconnected at a withstand current or less of potential transformer 47.

In the configuration shown in FIG. 10, when potential transformer 47 is used in a normal state, the impedance becomes low in a DC manner to thereby allow effective grounding, whereas the impedance becomes high in an AC manner to thereby reduce a fault current. Further, upon occurrence of a fault, fuse 48 is disconnected before the fault current becomes excessive, so that potential transformer 47 can be more precisely protected.

Figure 11:
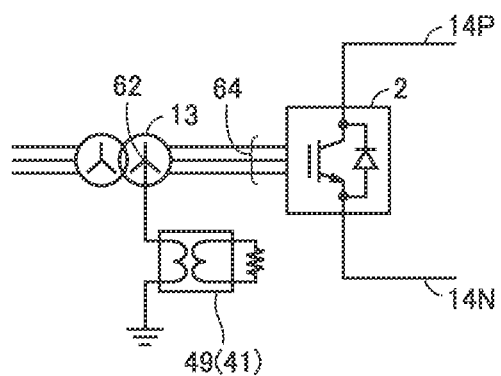
FIG. 11 is a diagram showing an example in which a grounding transformer is applied as an impedance circuit.

FIG. 11 is a diagram showing an example in which a grounding transformer is applied as impedance circuit 41. Referring to FIG. 11, a grounding transformer 49 as impedance circuit 41 is connected between neutral point 62 on the secondary side of transformer 13 and the ground. Specifically, the primary winding of grounding transformer 49 is connected between neutral point 62 and the ground. Since grounding transformer 49 functions as an inductor, the same effect as that achieved by iron-core reactor 44 described above can be achieved.

Specifically, when neutral point 62 is grounded via grounding transformer 49, the impedance becomes low in a DC manner to thereby allow effective grounding, whereas the impedance becomes high in an AC manner to thereby allow reduction of a fault current. Further, grounding transformer 49 is generally larger in withstand current than potential transformer 47. Thus, it is advantageous that burnout is less likely to occur in grounding transformer 49 than in potential transformer 47 even when grounding transformer 49 is saturated upon occurrence of a ground fault in DC system 14 or on AC line 64.

Figure 12:
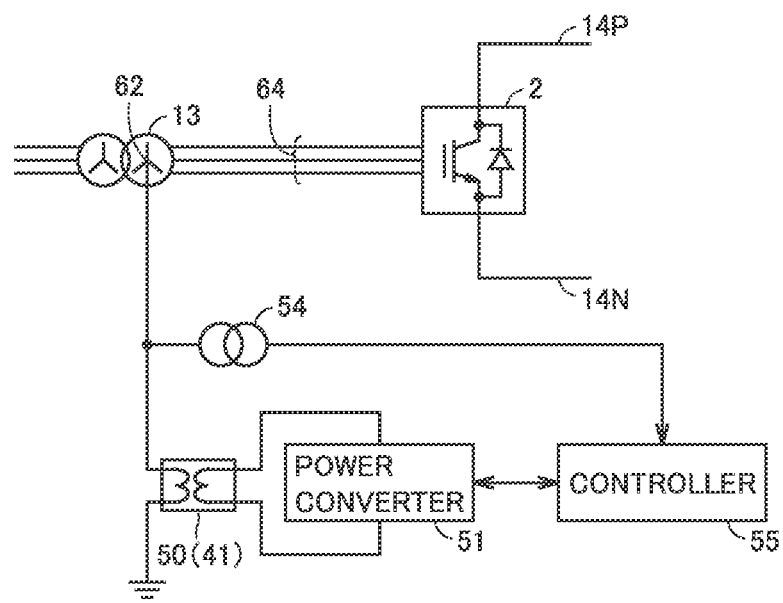
FIG. 12 is a diagram showing an example in which a power converter is connected to a power converter-supporting transformer as an impedance circuit.

FIG. 12 is a diagram showing an example in which a power converter is connected to a power converter-supporting transformer as impedance circuit 41. Referring to FIG. 12, a power converter-supporting transformer 50 as impedance circuit 41 is connected between neutral point 62 on the secondary side of transformer 13 and the ground. Specifically, the primary winding of power converter-supporting transformer 50 is connected between neutral point 62 and the ground. Since power converter-supporting transformer 50 functions as an inductor, the same effect as that achieved by iron-core reactor 44 described above is achieved.

Power converter-supporting transformer 50, which is a single-phase transformer for power conversion, has a primary winding connected between neutral point 62 and the ground, and a secondary winding connected to a power converter 51. Power converter 51 may be any one of a self-excited power converter and a separately-excited power converter as long as it can function to control a voltage.

Further, a controller 55 controls the operation of power converter 51. Typically, controller 55 has a hardware configuration similar to that of controller 3 and is configured of a digital protection controller, for example. A voltage detector 54 detects a voltage Vo that is a voltage to ground between neutral point 62 and the ground. Controller 55 receives the input of voltage Vo detected by voltage detector 54 and constantly monitors voltage Vo.

In a normal state, controller 55 does not operate power converter 51 but brings it into a standby state. However, when a ground fault occurs in DC system 14 or on AC line 64, controller 55 detects an increase in voltage Vo and controls power converter 51 to output the counter voltage of voltage Vo. Specifically, according to an instruction from controller 55, power converter 51 controls a secondary-side voltage V2 of power converter-supporting transformer 50 such that a difference voltage between voltage Vo and a primary-side voltage V1 of power converter-supporting transformer 50 (i.e., the counter voltage of voltage Vo) is less than a threshold voltage Vth. For example, the difference voltage shows a difference between the amplitude value of voltage Vo and the amplitude value of primary-side voltage V1, or a difference between the effective value of voltage Vo and the effective value of primary-side voltage V1. Thus, the fault current flowing through power converter-supporting transformer 50 can be reduced.

Therefore, according to the configuration in FIG. 12, when power converter-supporting transformer 50 is used in the normal state, the impedance becomes low in a DC manner to thereby allow effective grounding, whereas the impedance becomes high in an AC manner to thereby allow reduction of a fault current. Further, upon occurrence of a fault, secondary-side voltage V2 of power converter-supporting transformer 50 is controlled to output the counter voltage (that is, primary-side voltage V1) with respect to the voltage to ground at neutral point 62, with the result that the fault current can be reduced.

(Filter Circuit)

Figure 13:
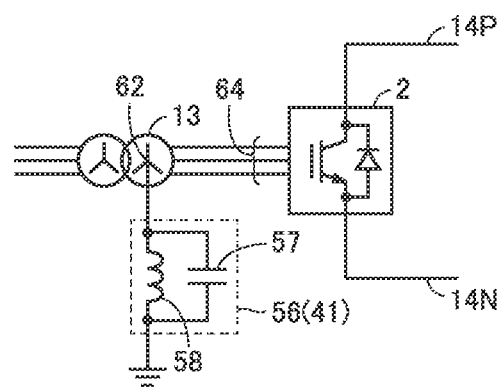
FIG. 13 is a diagram showing an example in which a filter circuit is applied as an impedance circuit.

FIG. 13 is a diagram showing an example in which a filter circuit is applied as impedance circuit 41. Referring to FIG. 13, a filter circuit 56 as impedance circuit 41 is a parallel circuit in which reactor 58 and capacitor 57 are connected in parallel. Note that reactor 58 may be any one of air-core reactor 43, iron-core reactor 44, and gapped iron-core reactor 45 as described above.

When a method of superimposing a third-order harmonic on the output voltage is employed in power converter 2, the third-order harmonic is applied to neutral point 62 of transformer 13 both in the normal state and upon occurrence of a ground fault. Further, upon occurrence of a ground fault, a fundamental wave is also applied to neutral point 62. Thus, in order to reduce the current flowing through the ground, impedance circuit 41 is preferably high in impedance at least with respect to the voltage of each frequency of the fundamental wave and the third-order harmonic.

Therefore, in the configuration in FIG. 13, filter circuit 56 that is high in impedance with respect to the fundamental wave component and the third-order harmonic component of the output voltage from power converter 2 is connected between neutral point 62 and the ground. This can reduce the current resulting from the fundamental wave and the third-order harmonic and flowing to the ground in the normal state and upon occurrence of a ground fault. Specifically, filter circuit 56 is configured to attenuate the fundamental wave component and the third-order harmonic component of the output voltage from power converter 2. For example, filter circuit 56 may be a low-pass filter that attenuates the voltage corresponding to the frequency equal to or higher than the frequency corresponding to the fundamental wave component (that is, equal to or higher than a fundamental frequency).

When a reactor alone is employed to implement a high impedance with respect to the fundamental wave component and the third-order harmonic component, the entire size is increased but can be reduced when filter circuit 56 is applied. Further, according to filter circuit 56, adjustment of the inductance of reactor 58 and the capacitance of capacitor 57 allows a high impedance with respect to a prescribed number of order. Further, since filter circuit 56 is configured of a parallel circuit of reactor 58 and capacitor 57, the DC current flows through reactor 58. Thus, the impedance does not become high in a DC manner, so that the DC potential to ground of power converter 2 can be fixed.

Therefore, according to the configuration in FIG. 13, the ground current in the normal state and upon occurrence of a ground fault can be reduced while reducing the size of impedance circuit 41.

<Inductance of Impedance Circuit>

Referring to FIGS. 4 to 13, the configuration example of impedance circuit 41 has been described. The following describes a method of setting the inductance of impedance circuit 41.

In power conversion system 100, stray capacitances exist between power converter 2 and the ground and also between DC system 14 and the ground. Thus, there is a resonance frequency defined by each stray capacitance and an inductance Ls of impedance circuit 41 that is connected between neutral point 62 and the ground. On the other hand, controller 3 controls power converter 2 at a predetermined control frequency Fs. Accordingly, when control frequency Fs used for controlling power converter 2 falls within a prescribed range centered on the resonance frequency, resonance may occur to thereby cause instability in the operation of power converter 2.

Thus, inductance Ls of impedance circuit 41 is set to prevent occurrence of the above-mentioned resonance. Specifically, a stray capacitance C1 between power converter 2 and the ground and a stray capacitance C2 between DC system 14 and the ground are estimated in advance. Then, a resonance frequency f1 defined by stray capacitance C1 and inductance Ls, and a resonance frequency f2 defined by stray capacitance C2 and inductance Ls are calculated.

Then, inductance Ls of impedance circuit 41 is set to satisfy conditions Y1 and Y2. Specifically, on condition Y1, the difference frequency as a difference between resonance frequency f1 and control frequency Fs is equal to or greater than a threshold value Fth (for example, twice as high as control frequency Fs). On condition Y2, the difference frequency between resonance frequency f2 and control frequency Fs is equal to or greater than threshold value Fth.

In an alternative configuration, a stray capacitance existing between peripheral devices (for example, a cooling device) of power converter 2 and the ground may be taken into consideration. In this case, a resonance frequency f3 defined by inductance Ls and a stray capacitance C3 between the peripheral device and the ground is calculated. Further, in addition to conditions Y1 and Y2, inductance Ls may be set to satisfy a condition Y3 that the difference between resonance frequency f3 and control frequency Fs is equal to or greater than threshold value Fth.

Note that inductance Ls may be set in consideration of only one of conditions Y1 to Y3 in accordance with the influence exerted upon the operation of power converter 2. For example, inductance Ls may be set to satisfy only condition Y1 or may be set to satisfy only condition Y2.

By setting the inductance of impedance circuit 41 as described above, power converter 2 can be stably operated. Further, by designing impedance circuit 41 so as to satisfy the above-described conditions A1 to A3 and conditions Y1 to Y3, the current upon occurrence of a ground fault can be reduced, the current resulting from the third-order harmonic in the normal state can be reduced, the DC voltage fluctuation can be suppressed, and occurrence of resonance can be prevented.

<Advantages>

According to the first embodiment, neutral point 62 of transformer 13 is grounded via impedance circuit 41, and thereby, the fault current flowing upon occurrence of a ground fault on the AC side or the DC side of self-excited power converter 2 can be reduced while fixing the DC potential to ground of self-excited power converter 2.

Second Embodiment

In the above description about the configuration in the first embodiment, impedance circuit 41 is connected to neutral point 62 of transformer 13 as shown in FIG. 1. In the following description about the configuration in the second embodiment, an impedance circuit is connected to neutral point 62 of transformer 13 and neutral point 62A of transformer 13A.

Figure 14:
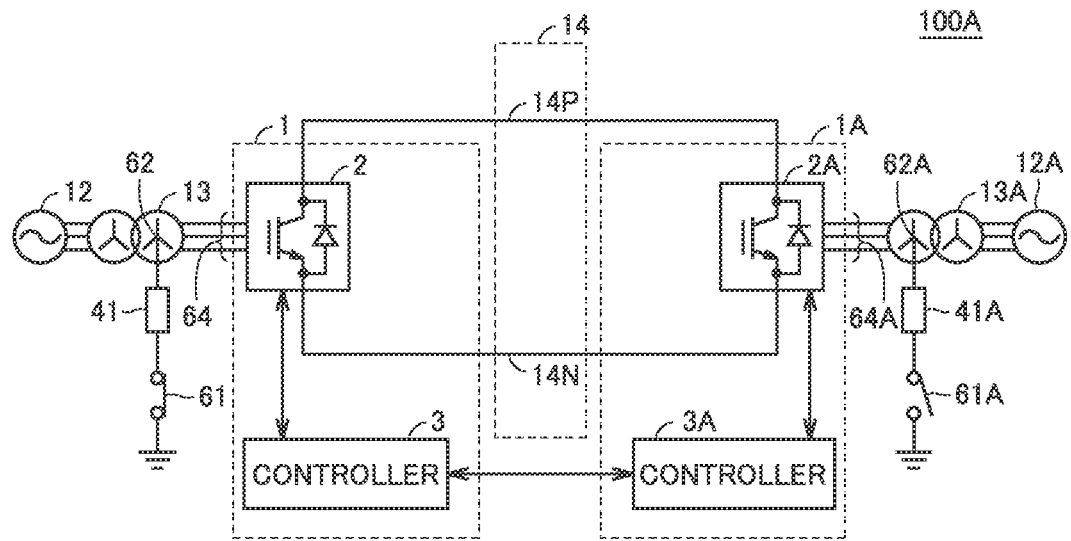
FIG. 14 is a diagram showing a schematic configuration of a power conversion system according to a second embodiment.

FIG. 14 is a diagram showing a schematic configuration of a power conversion system 100A according to the second embodiment. Referring to FIG. 14, power conversion system 100A has the same configuration as that of power conversion system 100 in FIG. 1 except that power conversion system 100A additionally includes switches 61 and 61A and an impedance circuit 41A that is connected to neutral point 62A. Typically, impedance circuit 41A has the same configuration as that of impedance circuit 41. Impedance circuit 41A is connected between neutral point 62A and the ground.

Switch 61 is connected in series to impedance circuit 41. Specifically, switch 61 is connected between impedance circuit 41 and the ground. However, switch 61 may be connected between neutral point 62 and impedance circuit 41. Switch 61A is connected in series to impedance circuit 41A. Specifically, switch 61A is connected between impedance circuit 41A and the ground. However, switch 61A may be connected between neutral point 62A and impedance circuit 41A.

Further, BTB or HVDC is implemented by connecting two or more power converters 2 through a DC power transmission line. In power conversion system 100A, in order to fix the DC potential to ground of each of power converters 2 and 2A, neutral point 62 of transformer 13 or neutral point 62A of transformer 13A may be grounded via an impedance circuit. In contrast, when neutral points 62 and 62A are grounded via an impedance circuit, a loop current flows through neutral point 62, the ground, and neutral point 62A, which is not preferable from the viewpoints of an increase in current loss and environmental influences.

On the other hand, in the case of BTB or HVDC, the operation performed only by a sound power converter may be required also when one of power converters 2 and 2A is unable to operate upon occurrence of a fault or during maintenance. In an operation conceivable also in a two terminal-type BTB or HVDC, a switch (not shown) provided in the DC power transmission line (i.e., DC system 14) is opened to disconnect an inoperable power converter from a sound power converter and output only reactive power to the system. In such a case, in order to fix the DC voltage to ground of the sound power converter, the neutral point of the transformer connected to the sound power converter needs to be grounded via an impedance circuit.

Thus, in a normal state, only the neutral point of the transformer connected to one of power converters 2 and 2A is grounded via an impedance circuit, whereas the neutral point of the transformer connected to the other of power converters 2 and 2A is not grounded. Further, in a preferable configuration, when one power converter connected to the transformer having the grounded neutral point is unable to operate, the neutral point of the transformer connected to the other power converter can be grounded via an impedance circuit.

Thus, in power conversion system 100A, neutral point 62 is grounded via impedance circuit 41 and switch 61, and neutral point 62A is grounded via impedance circuit 41A and switch 61A. In the normal state, switches 61 and 61A are controlled to thereby ground only one of neutral points 62 and 62A via impedance circuit 41 or 41A. In other words, one of switches 61 and 61A is closed while the other is opened. Thus, the DC potential to ground of each of power converters 2 and 2A can be fixed to thereby prevent a loop current from flowing through neutral points 62 and 62A and the ground in the normal state.

For example, when power converter 2 is unable to operate in the state where only neutral point 62 is grounded via impedance circuit 41, a switch (not shown) provided in DC system 14 is opened to thereby disconnect this power converter 2 from the system. Further, switch 61 is opened and switch 61A is closed to thereby ground neutral point 62A via impedance circuit 41A. Thereby, the DC potential to ground of sound power converter 2A can be fixed. Note that controller 3 controls switch 61 to be opened and closed while controller 3A controls switch 61A to be opened and closed. Further, controller 3 or 3A controls the switch provided in DC system 14 to be opened and closed.

The following describes an example of a processing procedure. In this case, in the initial state, neutral point 62 is grounded via impedance circuit 41 and neutral point 62A is not grounded. When a fault occurs on the AC side or the DC side of power converter 2 (or upon arrival of the maintenance timing of power converter 2), controller 3 stops the operation of power converter 2. Controller 3 opens an AC breaker (not shown) provided between AC system 12 and transformer 13, and opens a switch provided in DC system 14 to thereby disconnect power converter 2 from the system. Further, controller 3 opens switch 61.

Based on the amount of electricity obtained from each detector (for example, AC current detector 16, AC voltage detector 10, DC voltage detectors 11A and 11B), controller 3 may perform control computation. Then, when the computed value exceeds a set value, controller 3 may determine that a fault has occurred or may receive a notification indicating occurrence of a fault from an external device. Further, controller 3 may determine the arrival of the maintenance timing based on the information stored in advance in an internal memory or may receive a notification indicating the arrival of the maintenance timing from an external device.

When controller 3A receives a notification about an instruction to stop the operation of power converter 2 from controller 3, controller 3A closes switch 61A. Thereby, neutral point 62A is grounded via impedance circuit 41.

<Advantages>

According to the second embodiment, impedance circuit 41 and the switch are connected in series to each of neutral points 62 and 62A, and thereby, only one of the neutral points can be grounded via impedance circuit 41 both in the normal state and upon occurrence of a fault. Thus, the DC potential to ground of each of power converters 2, 2A can be fixed while preventing a loop current.

Third Embodiment

In the above description about the configuration in the first embodiment, impedance circuit 41 is connected between neutral point 62 and the ground. In the following description about a configuration in the third embodiment, an impedance circuit is connected between AC line 64 and the ground.

Figure 15:
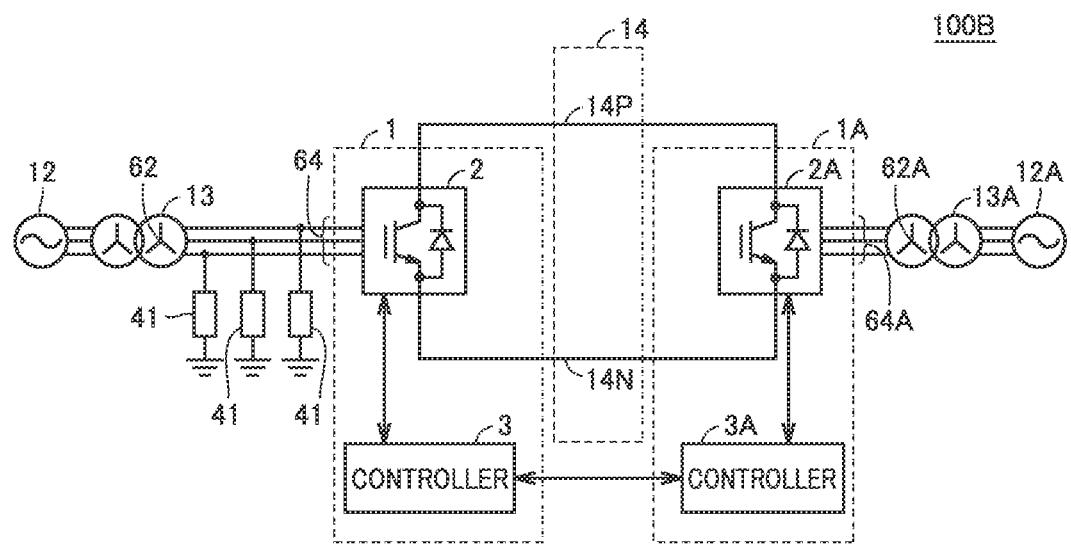
FIG. 15 is a diagram showing a schematic configuration of a power conversion system according to a third embodiment.

FIG. 15 is a diagram showing a schematic configuration of a power conversion system 100B according to the third embodiment. Referring to FIG. 15, power conversion system 100B is different from power conversion system 100 in that impedance circuit 41 is not connected to neutral point 62 unlike power conversion system 100 in FIG. 1 but is connected to AC line 64. Other configurations of power conversion system 100B are the same as those of power conversion system 100.

Specifically, impedance circuit 41 is connected between each phase (for example, a U phase, a V phase, and a W phase) of AC line 64 and the ground. Thereby, the DC potential to ground of power converter 2 can be fixed in the same manner as in the configuration in which neutral point 62 is grounded via impedance circuit 41 as in power conversion system 100 shown in FIG. 1.

Further, according to the configuration in which each phase of AC line 64 is grounded via impedance circuit 41 as in power conversion system 100B, a transformer having a connection with no neutral point on the secondary side can be employed as transformer 13. For example, a three-phase transformer configured in a Y-Δ connection can be employed as transformer 13.

In general, in a configuration in which a third-order harmonic is superimposed on the output voltage from power converter 2, a Δ connection is applied to any one of windings of transformer 13 in order to prevent the third-order harmonic from flowing out to AC system 12. Further, when AC system 12 is an ultrahigh voltage system, the primary winding of transformer 13 is Y-connected in many cases. In view of such a situation, it is preferable in the case of power conversion system 100 shown in FIG. 1 that the secondary winding of transformer 13 is Y-connected in order to provide a neutral point and a tertiary winding configured in a Δ connection is newly provided. This requires a three-phase transformer configured in a Y-Y-Δ connection to be employed as transformer 13. On the other hand, power conversion system 100B is larger in number of impedance circuits 41 than power conversion system 100, but can employ a three-phase transformer configured in a Y-Δ connection as transformer 13, with the result that the cost of transformer 13 can be reduced.

Note that impedance circuits 41 shown in FIG. 15 may have the same configuration as that of impedance circuit 41 shown in FIGS. 4 to 13. Also, when the configuration of impedance circuit 41 shown in FIG. 12 is employed for each impedance circuit 41 shown in FIG. 15, voltage detector 54 for detecting the AC voltage in each phase and power converter 51 for controlling the voltage in each phase are provided. In this case, according to an instruction from controller 55, power converter 51 corresponding to each phase controls secondary-side voltage V2 such that the difference voltage between the AC voltage, which occurs between AC line 64 and the ground, and primary-side voltage V1 of power converter-supporting transformer 50 is less than threshold voltage Vth.

Further, the second embodiment may be combined with the third embodiment. In this case, impedance circuit 41A is connected between AC line 64A and the ground. More specifically, impedance circuit 41 and switch 61 are connected in series to each phase of AC line 64, and impedance circuit 41A and switch 61A are connected in series to each phase of AC line 64A. Also, switches 61 and 61A are controlled to be opened and closed such that each phase of AC line 64 or each phase of AC line 64A is grounded via impedance circuit 41. For example, when each switch 61 is closed and each phase of AC line 64 is grounded via impedance circuit 41, each switch 61A is opened and each phase of AC line 64A is not grounded.

<Advantages>

According to the third embodiment, the same advantages as those achieved in the first embodiment are achieved without limiting the configuration of transformer 13.

Fourth Embodiment

In the description about the configuration in the above embodiment, the AC side of power converter 2 (for example, neutral point 62 and each phase of AC line 64) is grounded via impedance circuit 41. In the following description about a configuration in the fourth embodiment, the DC side of power converter 2 is grounded via an impedance circuit.

Figure 16:
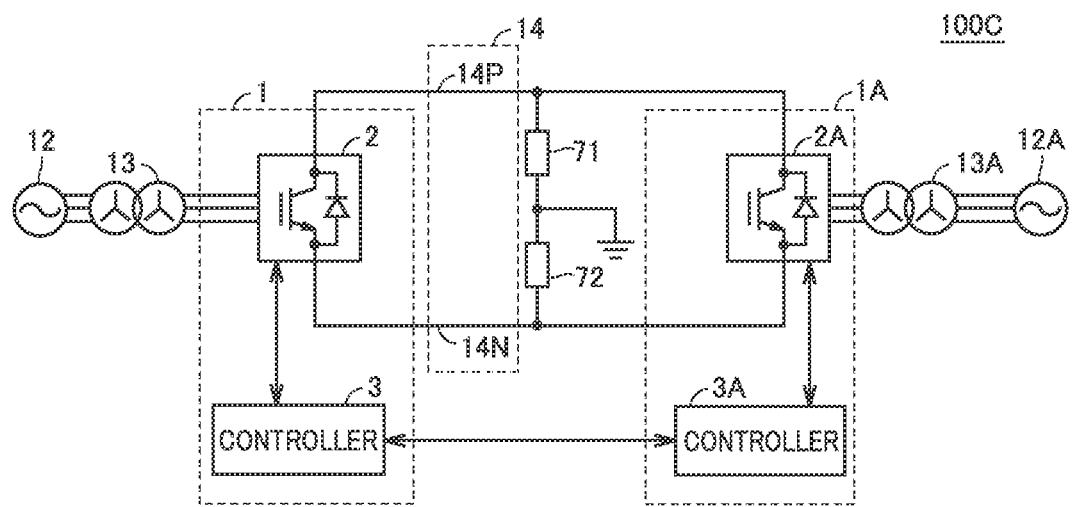
FIG. 16 is a diagram showing a schematic configuration of a power conversion system according to a fourth embodiment.

FIG. 16 is a diagram showing a schematic configuration of a power conversion system 100C according to the fourth embodiment. Referring to FIG. 16, power conversion system 100C is different from power conversion system 100 in FIG. 1 in that impedance circuit 41 is not connected to neutral point 62 unlike power conversion system 100 in FIG. 1 but an impedance circuit is connected to DC system 14. Other configurations of power conversion system 100C are the same as those of power conversion system 100.

Specifically, an impedance circuit 71 is connected to DC power transmission line 14P on the positive electrode side and an impedance circuit 72 is connected to DC power transmission line 14N on the negative electrode side. A line connecting impedance circuits 71 and 72 is grounded. Impedance circuits 71 and 72 each need to have a high impedance in a DC manner in order to reduce the current flowing in a normal state and upon occurrence of a fault. Thus, impedance circuits 71 and 72 each are configured of at least one of a resistance and a capacitor. Therefore, impedance circuits 71 and 72 are different from the above-described impedance circuit 41 that is low in impedance in a DC manner.

According to the above-described configuration, the current flowing in the normal state and upon occurrence of a fault can be reduced while fixing the DC potential to ground of power converter 2. In the description about the example of the configuration in FIG. 16, the line connecting impedance circuits 71 and 72 is grounded, but the present disclosure is not limited thereto. For example, impedance circuits 71 and 72 may not be connected to each other but may be directly grounded. Thus, it is preferable that DC power transmission line 14P on the positive electrode side is grounded via impedance circuit 71 while DC power transmission line 14N on the negative electrode side is grounded via impedance circuit 72.

<Advantages>

According to the fourth embodiment, DC power transmission lines 14P and 14N are grounded via impedance circuits 71 and 72, respectively, so that the current flowing in the normal state and upon occurrence of a fault can be reduced while fixing the DC potential to ground of self-excited power converter 2.

Fifth Embodiment

Figure 17:
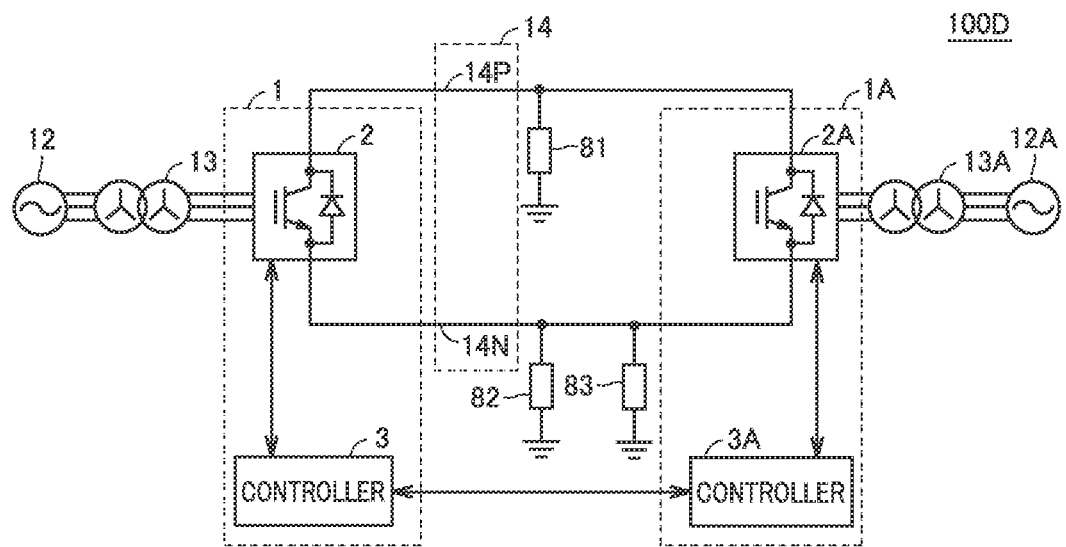
FIG. 17 is a diagram showing a schematic configuration of a power conversion system according to a fifth embodiment.

FIG. 17 is a diagram showing a schematic configuration of a power conversion system 100D according to the fifth embodiment. Referring to FIG. 17, power conversion system 100D is configured such that the impedance to ground on the DC side of power converter 2 is balanced between the positive electrode and the negative electrode.

In general, power converter 2 is additionally provided with a cooling device and the like, and an impedance to ground such as a stray capacitance and an insulation resistance exists between this additionally provided device and the ground. In the case of a cable-system HVDC, DC system 14 has a capacitance to ground that is appropriate to the line length. An impedance to ground 81 exists between the DC terminal on the positive electrode side of power converter 2 and the ground, and between DC power transmission line 14P and the ground. An impedance to ground 82 exists between the DC terminal on the negative electrode side of power converter 2 and the ground, and between DC power transmission line 14N and the ground.

In the state where impedance to ground 81 and impedance to ground 82 are balanced (i.e., are the same), the DC potential to ground of power converter 2 can be fixed. Thus, the devices each having an impedance to ground are designed such that impedance to ground 81 and impedance to ground 82 are balanced. When impedance to ground 81 and impedance to ground 82 are not balanced in terms of configuration, an impedance circuit 83 is added to DC power transmission line 14P or 14N such that the impedance to ground is balanced between the positive electrode and the negative electrode. In the example in FIG. 17, impedance circuit 83 is connected to DC power transmission line 14N. Thereby, the DC potential to ground of power converter 2 can be fixed.

<Advantages>

According to the fifth embodiment, by designing the impedance to ground to be balanced between the positive electrode side and the negative electrode side of power converter 2, the DC potential to ground of power converter 2 can be fixed.

Other Embodiments (1) In the above-described first embodiment, various configuration examples of impedance circuit 41 have been described, but the present disclosure is not limited thereto. For example, a power converter may be used as impedance circuit 41.

Figure 18:
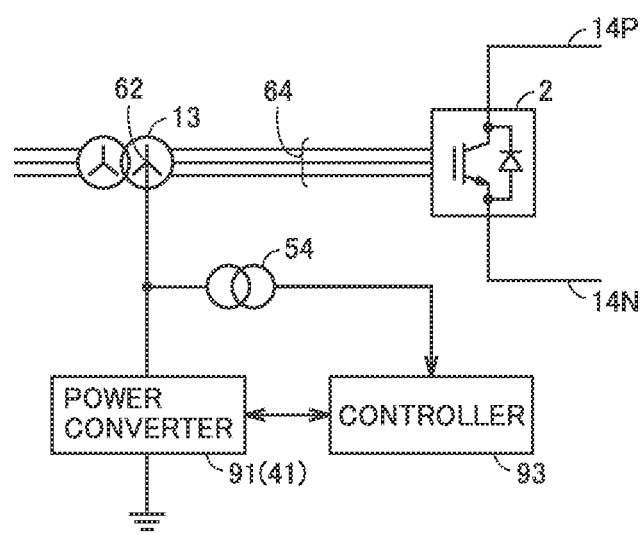
FIG. 18 is a diagram showing an example in which a power converter is applied as an impedance circuit.

FIG. 18 is a diagram showing an example in which a power converter is applied as an impedance circuit. Referring to FIG. 18, a power converter 91 as impedance circuit 41 is connected between neutral point 62 on the secondary side of transformer 13 and the ground.

A controller 93 controls the operation of power converter 91. Typically, controller 93 has a hardware configuration similar to that of controller 3 and is configured of a digital protection controller, for example. Voltage detector 54 detects voltage Vo that is a voltage to ground between neutral point 62 and the ground. Controller 93 receives the input of voltage Vo detected by voltage detector 54 and constantly monitors voltage Vo.

In the normal state, according to an instruction from controller 93, power converter 91 controls the output voltage to be equivalent to the inductor with respect to neutral point 62. Based on voltage Vo, controller 93 determines whether an AC voltage is applied to neutral point 62, or a DC voltage is applied to neutral point 62, or both an AC voltage and a DC voltage are applied to neutral point 62. Specifically, upon satisfaction of a condition B1 that the polarity of the voltage applied to neutral point 62 periodically changes and the voltage is symmetric between the positive and negative sides, controller 93 determines that the AC voltage is applied to neutral point 62. Further, upon satisfaction of a condition B2 that the polarity of the voltage applied to neutral point 62 is constant and the amplitude of the voltage does not change, controller 93 determines that the DC voltage is applied to neutral point 62. Further, when the voltage applied to neutral point 62 does not satisfy both conditions B1 and B2, controller 93 determines that both the AC voltage and the DC voltage are applied to neutral point 62.

When controller 93 determines that the AC voltage is applied to neutral point 62, controller 93 causes power converter 91 to output the counter voltage of voltage Vo. Specifically, according to an instruction from controller 93, power converter 91 controls an output voltage Vs from power converter 91 (i.e., the counter voltage of voltage Vo) such that the difference voltage between voltage Vo and output voltage Vs is less than threshold voltage Vth. For example, the difference voltage shows a difference between the amplitude value of voltage Vo and the amplitude value of output voltage Vs, or a difference between the effective value of voltage Vo and the effective value of output voltage Vs. Thereby, the AC current flowing to the ground can be reduced.

On the other hand, when controller 93 determines based on voltage Vo that the DC voltage is applied to neutral point 62, controller 93 causes power converter 91 to output a zero voltage. Specifically, power converter 91 controls output voltage Vs to be a zero voltage according to an instruction from controller 93. This causes the current to flow to the ground.

Further, when controller 93 determines based on voltage Vo that the AC voltage and the DC voltage are applied to neutral point 62, controller 93 causes power converter 91 to output a counter voltage for only the AC component of voltage Vo. Specifically, controller 93 generates an AC voltage Voac obtained by extracting only the AC component from voltage Vo. According to an instruction from controller 93, power converter 91 controls output voltage Vs such that the difference voltage between AC voltage Voac and output voltage Vs from power converter 91 is less than threshold voltage Vth. In this case, output voltage Vs corresponds to the counter voltage of the AC component (i.e., AC voltage Voac) of voltage Vo. This allows the DC current component to flow to the ground while reducing the AC current component flowing to the ground.

By performing the above-described control operation in a normal state in which no fault occurs, power converter 91 can be equivalently regarded as an inductor, and thus, the same effect as that achieved by grounding via iron-core reactor 44 described above can be achieved.

Further, when a ground fault occurs in DC system 14 or on AC line 64, an AC voltage is applied to neutral point 62. Thus, controller 93 causes power converter 91 to output the counter voltage of voltage Vo. Specifically, according to an instruction from controller 93, power converter 91 controls output voltage Vs such that the difference voltage between voltage Vo and output voltage Vs is less than threshold voltage Vth. Thereby, the fault current flowing to the ground can be reduced.

Due to the control operation by power converter 91 as described above, when power converter 91 is used in a normal state, the impedance becomes low in a DC manner to thereby allow effective grounding, whereas the impedance becomes high in an AC manner to thereby allow reduction of the current. Also, upon occurrence of a fault, power converter 91 is controlled to output the counter voltage (i.e., output voltage Vs) with respect to the voltage to ground at neutral point 62, so that the fault current can be reduced.

When the configuration of impedance circuit 41 shown in FIG. 18 is employed for each impedance circuit 41 shown in FIG. 15, voltage detector 54 for detecting the AC voltage in each phase and power converter 91 for controlling the voltage in each phase are provided. In this case, power converter 91 corresponding to each phase performs the above-described control operation according to an instruction from controller 93.

(2) The configurations exemplified in the above-described embodiments are merely examples of the configuration of the present disclosure, and can be combined with other known techniques or can also be configured by modification such as partial omission within a scope not departing from the gist of the present disclosure. Further, the above-described embodiments may be implemented by appropriately employing a process(es) and a configuration(s) described in connection with other embodiments.

It should be understood that the embodiments disclosed herein are illustrative and non-restrictive in every respect. The scope of the present disclosure is defined by the terms of the claims, rather than the description above, and is intended to include any modifications within the meaning and scope equivalent to the terms of the claims.

REFERENCE SIGNS LIST

1, 1A power conversion device, 2, 2A, 51, 91 power converter, 3, 3A, 55, 93 controller, 4, 4u, 4v, 4w leg circuit, 5 upper arm, 6 lower arm, 7 sub-module, 8A, 8B, 58 reactor, 9A, 9B arm current detector, 10 AC voltage detector, 11A, 11B DC voltage detector, 12, 12A AC system, 13, 13A transformer, 14 DC system, 16 AC current detector, 41, 41A, 71, 72, 83 impedance circuit, 43 air-core reactor, 44 iron-core reactor, 45 gapped iron-core reactor, 46 resistance, 47 potential transformer, 48 fuse, 49 grounding transformer, 50 power converter-supporting transformer, 56 filter circuit, 57 capacitor, 61, 61A switch, 62, 62A neutral point, 64, 64A AC line, 81, 82 impedance to ground, 100, 100A, 100B, 100C, 100D power conversion system.

The invention claimed is:

1. A power conversion system comprising:
a self-excited power converter to perform power conversion between a first AC system and a DC system;
a first transformer having a primary side connected to the first AC system and a secondary side connected to the self-excited power converter and Y-connected; and
a first impedance circuit connected between a ground and a neutral point on the secondary side of the first transformer, wherein
the neutral point on the secondary side of the first transformer is not directly grounded, and
the first impedance circuit is configured of a first circuit including a reactor but not including a capacitor or including another transformer.

2. The power conversion system according to claim 1, wherein the reactor is an air-core reactor, an iron-core reactor, or a gapped iron-core reactor.

3. The power conversion system according to claim 1, wherein
the first impedance circuit is configured of the first circuit,
the reactor is an iron-core reactor or a gapped iron-core reactor, and
the first circuit is configured of
a series circuit in which the iron-core reactor and a resistance are connected in series, or
a series circuit in which the gapped iron-core reactor and the resistance are connected in series.

4. The power conversion system according to claim 1, wherein
the first impedance circuit includes the another transformer, and
the another transformer is a potential transformer.

5. The power conversion system according to claim 4, wherein the first impedance circuit is configured of a series circuit in which the potential transformer and a resistance are connected in series.

6. The power conversion system according to claim 4, wherein the first impedance circuit is configured of a series circuit in which the potential transformer and a fuse are connected in series.

7. The power conversion system according to claim 1, wherein
the first impedance circuit includes the another transformer, and
the another transformer is a grounding transformer.

8. The power conversion system according to claim 1, wherein the self-excited power converter is a modular multi-level conversion-type power converter.

9. The power conversion system according to claim 2, wherein the self-excited power converter is a modular multi-level conversion-type power converter.

10. The power conversion system according to claim 3, wherein the self-excited power converter is a modular multi-level conversion-type power converter.

11. The power conversion system according to claim 4, wherein the self-excited power converter is a modular multi-level conversion-type power converter.

12. The power conversion system according to claim 5, wherein the self-excited power converter is a modular multi-level conversion-type power converter.

13. The power conversion system according to claim 6, wherein the self-excited power converter is a modular multi-level conversion-type power converter.

14. The power conversion system according to claim 7, wherein the self-excited power converter is a modular multi-level conversion-type power converter.

15. A power conversion system comprising:
a self-excited power converter to perform power conversion between a first AC system and a DC system;
a first transformer having a primary side connected to the first AC system and a secondary side connected to the self-excited power converter; and
a first impedance circuit connected between a ground and a neutral point on the secondary side of the first transformer, or between the ground and an AC line connecting the secondary side of the first transformer and the self-excited power converter, wherein
the neutral point on the secondary side of the first transformer is not directly grounded, and
the first impedance circuit includes the another transformer, the power conversion system further comprises another power converter connected to a secondary side of the another transformer, and when a primary side of the another transformer is connected between the neutral point and the ground, the another power converter controls a secondary-side voltage of the another transformer such that a difference voltage between a primary-side voltage of the another transformer and a voltage between the neutral point and the ground is less than a threshold voltage.

16. A power conversion system comprising:
a self-excited power converter to perform power conversion between a first AC system and a DC system;
a first transformer having a primary side connected to the first AC system and a secondary side connected to the self-excited power converter; and
a first impedance circuit connected between a ground and a neutral point on the secondary side of the first transformer, or between the ground and an AC line connecting the secondary side of the first transformer and the self-excited power converter, wherein
the neutral point on the secondary side of the first transformer is not directly grounded, and
the first impedance circuit includes one of a reactor and another transformer, the power conversion system further comprises:
a second transformer having a primary side connected to a second AC system;
another self-excited power converter connected to the self-excited power converter via the DC system and connected to a secondary side of the second transformer;
a second impedance circuit connected between a ground and a neutral point on the secondary side of the second transformer, or between the ground and an AC line connecting the secondary side of the second transformer and the another self-excited power converter;
a first switch connected in series to the first impedance circuit; and
a second switch connected in series to the second impedance circuit, wherein
the neutral point on the secondary side of the second transformer is not directly grounded,
the second impedance circuit includes one of the reactor and the another transformer, and
one of the first switch and the second switch is closed, and the other of the first switch and the second switch is opened.

17. The power conversion system according to claim 16, wherein
the first impedance circuit is configured of a filter circuit in which the reactor and a capacitor are connected in parallel, and
the filter circuit attenuates a fundamental wave component and a third-order harmonic component of an output voltage from the self-excited power converter.

18. A power conversion system comprising:
a self-excited power converter to perform power conversion between a first AC system and a DC system;

a first transformer having a primary side connected to the first AC system and a secondary side connected to the self-excited power converter; and
a first impedance circuit connected between a ground and a neutral point on the secondary side of the first transformer, or between the ground and an AC line connecting the secondary side of the first transformer and the self-excited power converter, wherein
the neutral point on the secondary side of the first transformer is not directly grounded,
the first impedance circuit includes another power converter,
when an AC voltage is applied to the neutral point, the another power converter controls an output voltage from the another power converter such that a difference voltage between the output voltage and a voltage between the neutral point and the ground is less than a threshold voltage, and
when a DC voltage is applied to the neutral point, the another power converter controls the output voltage to be a zero voltage.

19. A power conversion system comprising
a self-excited power converter to perform power conversion between a first AC system and a DC system;
a first transformer having a primary side connected to the first AC system and a secondary side connected to the self-excited power converter; and
a first impedance circuit connected between a ground and a neutral point on the secondary side of the first transformer, or between the ground and an AC line connecting the secondary side of the first transformer and the self-excited power converter, wherein
the neutral point on the secondary side of the first transformer is not directly grounded,
the first impedance circuit includes one of a reactor and another power converter,
an inductance of the first impedance circuit is set such that a difference frequency is equal to or greater than a threshold value, the difference frequency being a difference between
a resonance frequency defined from the inductance and a predetermined capacitance, and
a control frequency for controlling the self-excited power converter, and the predetermined capacitance is
a stray capacitance between the DC system to which the self-excited power converter is connected and the ground, or
a stray capacitance between the self-excited power converter and the ground.

20. The power conversion system according to claim 19, wherein
the first impedance circuit is configured of a filter circuit in which the reactor and a capacitor are connected in parallel, and
the filter circuit attenuates a fundamental wave component and a third-order harmonic component of an output voltage from the self-excited power converter.

* * * * *